United States Patent [19]

Rippberger

[11] Patent Number: 4,757,854
[45] Date of Patent: Jul. 19, 1988

[54] APPARATUS FOR DETACHABLY FASTENING A STRETCHABLE FABRIC PANEL TO A RIGID FRAME

[75] Inventor: Gary R. Rippberger, Boulder, Colo.

[73] Assignee: Bestop, Inc., Broomfield, Colo.

[21] Appl. No.: 19,438

[22] Filed: Feb. 26, 1987

[51] Int. Cl.[4] .............................................. A47H 13/00
[52] U.S. Cl. .................................... 160/391; 160/378; 160/395
[58] Field of Search ............... 160/391, 378, 395, 387; 38/102.1, 102.91; 296/121, 120 A

[56] References Cited

U.S. PATENT DOCUMENTS 3,354,473  11/1967  Schwartz et al. ............... 160/395 X
4,233,765  11/1980  O'Mullan et al. ............... 160/378 X Primary Examiner—Ramon O. Ramirez
Assistant Examiner—Blair M. Johnson
Attorney, Agent, or Firm—Edwin L. Spangler, Jr.

[57] ABSTRACT

This invention relates to an improved tongue and groove connector for detachably fastening a stretchable fabric panel to a rigid frame which is characterized by a tongue-forming element attached along a line intermediate the side edges thereof to the panel in face-to-face relation to the latter, the tongue being of a width substantially greater than the groove is deep so as to define an insertable portion to be seated in the groove and a projecting portion extending therebeyond which defines a handhold. The invention also encompasses the novel method of making the aforesaid connection which comprises grasping the handhold to stretch the fabric to a point where the leading edge of the insertable portion lies adjacent the entryway into the groove and thereafter releasing the hold upon the projecting portion of the strap thereby permitting the stretched fabric to pull the insertable portion into seated relation in the bottom of the groove.

7 Claims, 1 Drawing Sheet

U.S. Patent　　　　Jul. 19, 1988　　　　4,757,854
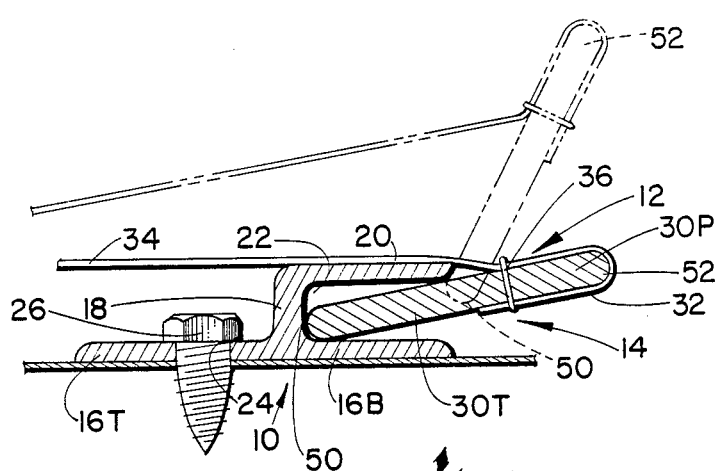
Fig. 1
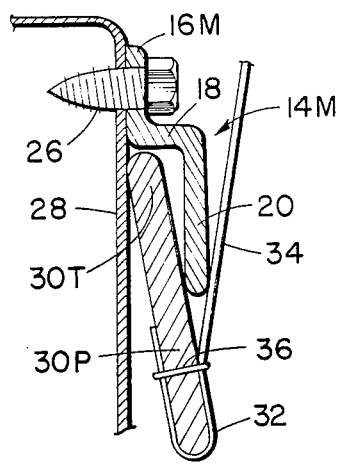
Fig. 4
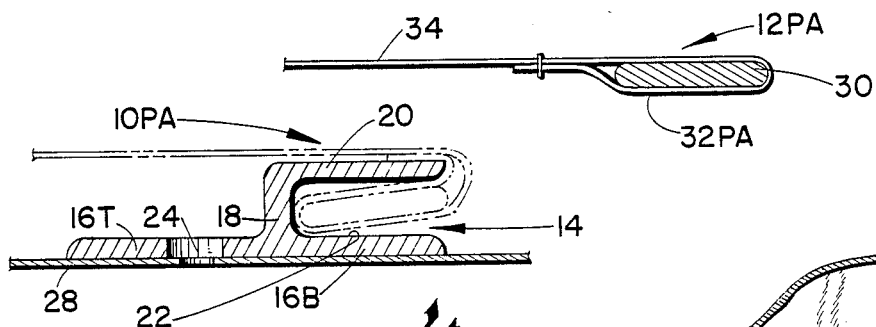
PRIOR ART
Fig. 2
Fig. 3
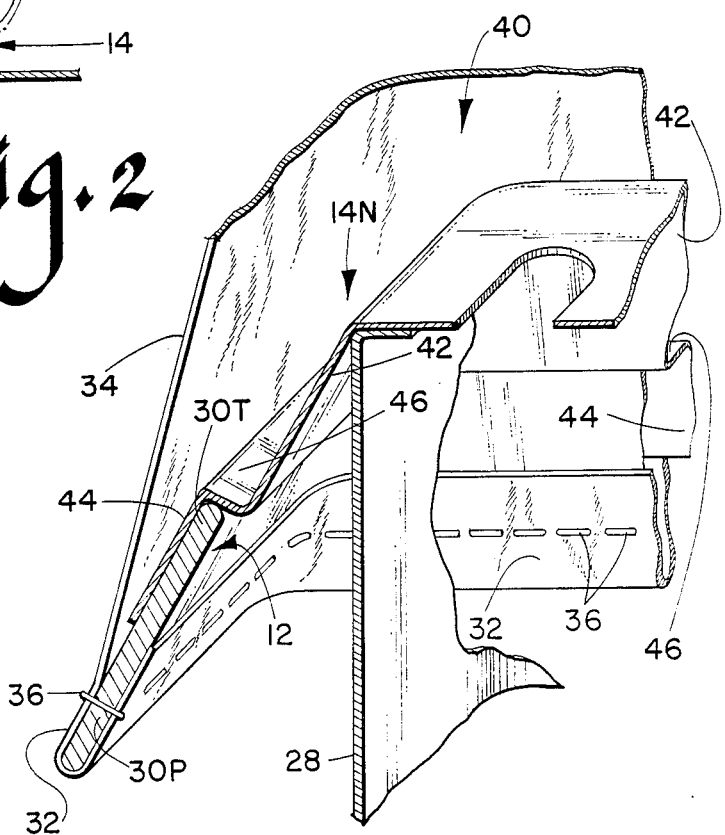

APPARATUS FOR DETACHABLY FASTENING A STRETCHABLE FABRIC PANEL TO A RIGID FRAME

BACKGROUND OF THE INVENTION

Protective covers of one type or another for keeping rain, dust, snow and other debris from getting into or on surfaces that would either be damaged by such contaminants or at least have to be cleaned prior to use are commonplace. Examples of such uses are convertible tops for vehicles, swimming pool covers, boat covers, so-called "tonneau covers" for open-topped truck beds, etc. In each instance, the cover, if it be made of some sort of fabric as opposed to a rigid lid-forming element, must be detachably fastened in some way to a rigid frame which generally borders and encloses the area to be protected. While seldom elastic in the sense of a rubber sheet or the like, nevertheless, they are usually "stretchable" to some modest degree due primarily to the nature of the fabric and its expanse. For instance, a canvas or vinyl vehicle top can be draped over a frame, pulled taut and stretched the half inch or so necessary to have the particular fasteners used to attach it to the vehicle body mate with one another.

The conventional connectors used for detachably fastening such covers to a frame bordering the area to be protected are, of course, such things as hooks-and-eyes, lacing a rope back and forth between anchoring elements carried by the frame through a series of grommets in the cover, snap fasteners, so-called "hook-and-loop" (Velcro) fasteners and probably many others. One particular method for fastening vinyl convertible tops to the body of a vehicle employs a grooved rail mounted on the latter into which is folded a tongue-forming stiffener sewn within the hem of the cover which will be more fully described in connection with the detailed description of the related art which will follow presently.

FIELD OF THE INVENTION

The present invention relates to an improved method and apparatus for detachably connecting a stretchable fabric cover to a rigid frame member.

DESCRIPTION OF THE RELATED ART

The use of hook-and-loop type fasteners for these same applications forms the subject matter of U.S. Pat. No. 4,272,119 issued to one, Robert M. Adams; however, the closest prior art known to applicant is not found in the aforementioned patent, but rather, the method and structure alluded to earlier which, so far as is known, has never been patented. It has been illustrated in the drawing which will be described in detail presently but, for present purposes, it will suffice to point out that it involves means defining a deeply-grooved channel-shaped rail which is fastened to the rigid supporting structure and an elongate tongue for insertion into the groove that is contained within a hem extending along a free edge of the fabric cover. When the fabric is stretched to the point where the tongue together with the fabric covering same can be turned under and released into the channel of the rail, the connection is complete. The cover is detached by reversing the aforementioned procedure.

SUMMARY OF THE INVENTION

The present invention relates to a simple, yet unobvious, improvement upon the prior art system just described wherein corresponding free edges of the tongue and fabric cover are bound together in face-to-face relation and in such a way that the opposite free edge of the tongue is exposed in position to enter the groove in the channel-forming means upon release of the stretch in the fabric without having to turn the tongue under as before. By so doing, the resultant force exerted upon the tongue by the stretched fabric is generally exerted in a direction parallel to the groove which tends to keep the tongue seated therein; whereas, with the prior art system, the pull exerted by the fabric upon the tongue was such as to try and unfold the latter and thus roll it out of the groove. The fabric does not have to be stretched as far to complete the connection and, once completed, it is far more secure. Even more significant, however, is the ease with which the fastening and unfastening of the connection is accomplished, especially the latter.

It is, therefore, the principal object of the present invention to provide a novel and improved method and apparatus for detachably fastening a stretchable fabric cover to a rigid frame bordering the area requiring protection.

A second objective is the provision of detachable fabric retention system which is much faster than other systems for the same purpose.

An additional object of the invention herein disclosed and claimed is to provide a simple two-part connector ideally suited for use in fastening convertible tops and the like to the body of a vehicle.

Another objective is that of providing a fabric retention system which will accommodate minor dimensional irregularities in the mating surfaces while, at the same time, maintaining a secure connection therebetween.

Still another object is one of providing a tongue-and-groove connection for joining fabric parts to rigid parts that is unique in its construction as well as the method of using same.

Further objects of the within-described invention are to provide a fabric-to-rigid-anchorpoint fastening system which is simple, easy to use, versatile, safe, inexpensive, lightweight, compact and even decorative.

Other objects will be in part apparent and in part pointed out specifically hereinafter in connection with the description of the drawings that follows.

BRIEF DESCRIPTION OF THE DRAWINGS

FIG. 1 is a fragmentary sectional view showing in phantom and full lines the improved tongue-and-groove connection and method of making same;

FIG. 2 is a fragmentary sectional view similar to FIG. 1 and to the same scale but differing in that it shows the prior art method and apparatus for forming a similar connection;

FIG. 3 is a fragmentary sectional view to the same scale as the preceding figures illustrating how the tongue is secured beneath the overhanging lip of a corner-forming rigid anchoring structure; and, FIG. 4 is a still another fragmentary sectional view similar to FIG. 1 showing a modified form of channel-forming element in which the support structure cooperates with the latter to define the channel.

DESCRIPTION OF THE PREFERRED EMBODIMENTS

Referring next to the drawings for a detailed description of the present invention and, initially, to FIG. 1 for this purpose, reference numeral 10 has been chosen to represent the two-element fastener in a general way and it will be seen to comprise a tongue-forming element and a groove forming element, the latter having been broadly referred to by reference numerals 12 and 14, respectively. Groove-forming element 14, in the particular form shown in FIG. 1 comprises a generally H-shaped extrusion having a backplate 16 defining the stem of the "H", a web 18 forming the crossbar portion thereof, and a flange 20 depending from the web in fixed-spaced parallel relation to the bottom leg 16B of the stem or backplate. Let 16B and stem 20 cooperate with one another and with web 18 connecting the two together to form the groove 22 of element 14. The top leg 16T of the backplate is preferably apertured as shown at 24 to receive fastener 26 by means of which it is attached to a rigid support or frame 28.

Tongue-forming element 12 comprises a relatively stiff, yet bendable, elongate plastic bar or strap 30 of sufficient thickness to effectively resist bending along a longitudinal line while, at the same time, allowing it to bend upon a transversely-extending line. More will be said about its bendability versus its stiffness in connection with the description of the method of using the fastener that will come later. The thickness of the tongue in relation to the width of the groove is such that the former is loosely seated within the latter much in the manner illustrated. Widthwise, the tongue is a good deal wider than the groove 22 is deep so as to leave a considerable portion (almost half) 30P of the tongue projecting beyond the mouth of the groove. On the other hand, the groove 22 is sufficiently deep in comparison to its width to hold the tongue end 30T of the tongue-forming element securely seated therein and capable of resisting a force pulling thereagainst acting generally in a direction to seat it against the bottom of the groove. Saying this another way, with the tongue-forming element seated in the bottom of the groove 22, no reasonable force pulling on the projecting portion 30P thereof in a direction to seat the tongue end 30T more firmly, even a bending one or one directed at an acute angle less than approximately 90°, should be able to dislodge it (see FIG. 3).

Now, it can be seen in both FIGS. 1 and 3, that the projecting portion 30T of the tongue-forming element 12 is at least partially encased in the fold or cuff 32 of stretchable fabric panel 34 so as to leave the tongue end 30T thereof extending back along the panel in face-to-face relation to the latter and free of its cuff. By way of contrast, the tongue-forming element 12PA of the prior art two-part connector 10PA shown in FIG. 2 will be seen to be completely encased within the hem 32PA of the fabric panel and, therefore, no portion of the strap 30 inside thereof is left free to enter the groove 22 of the groove-forming element 14.

Returning again to FIGS. 1 and 3, the projecting portion 30P of the tongue element 12 is shown sewn into the cuff as indicated at 36 although, of course, other fastening methods could be used such as staples, rivets, etc. In any event, the particular fastening means is relatively unimportant except, perhaps, in particular applications where rust or some other factor may be a problem. Preferably, the line of attachment of the panel to the tongue should lie outside the groove when the latter is seated therein as shown. Best of all, the line of attachment should lie closely adjacent the mouth of the groove as opposed to out near the free edge of projecting portion 30P.

Before describing in detail the method of using the fastener 10 and comparing it with the method of using the prior art connector 10PA, it might be well to point out that both systems use comparable groove-forming elements 14. In FIG. 4, on the other hand, a slightly modified form of tongue-retaining element 14M has been shown in which the bottom leg 16B of the backplate 16M has been eliminated and the frame 28 to which leg 16T is attached cooperates with flange 20 and web 18 to define groove 22. From a functional standpoint, the H-shaped tongue-forming element 14 of FIG. 1 and the offset tongue-retaining 14M of FIG. 4 which cooperates with the frame 28 to complete the groove, are essentially the same.

A still further modified, and actually unique, form of the tongue-retaining element 14N is shown in FIG. 3. In this embodiment, the portion of the corner-forming element that has been indicated broadly by reference numeral 40 which performs the same function as the groove-forming elements 14 of FIGS. 1 and 2, 14M and 28 of FIG. 4, is accomplished by element 14N which requires no groove analogous to groove 22 at all to hold and capture the tongue-forming element. In other words, while stepped flanges 42 and 44 interconnected by web 46 cooperate with one another to define an offset member not unlike tongue-retaining element 14M of FIG. 4 in cross section, because element 14N is curved, there is no necessity for having leg 16B or the frame 28 to complete the groove. Instead, as the tongue-forming element 12 is bent around the corner shaped by corner-forming element 40, it is held against the inside face of flange 44 and drawn snugly up against the web 46 without being backed up in any manner. Another way of looking at it is that once curved around the corner, the pull on the projecting portion 30P of the tongue that in a straight section would have more of a tendency to twist it away from flange 44 cannot do so. Apart from the tongue-retaining portion 14N of the corner-forming element 40 just described, the only other part is plate 48 atop the latter which, in the case of an open-topped four-wheel drive vehicle, bolts onto the rear outside corners of the body and bridges the gap between the straight sections of tongue-retaining elements 14 which extend along the sides and back.

Looking next at FIG. 2, the manner in which the prior art fastening system works will now be described in detail. It is first necessary to stretch the fabric panel 34 and pull the tongue-forming element 12PA far enough past the entryway or mouth of groove 22 such that it can be folded under as shown in phantom lines and tucked into the latter before being released. Moreover, it is not possible to do this in small short increments, i.e. by twisting the tongue-forming portion a bit at a time and feeding it into the groove. Instead, for all practical purposes, a whole run has to be stretched past the groove, turned under and fed into the latter more or less all at once. Unfortunately, this is a very difficult and time-consuming operation that generally requires two or more people working together to get it done. When one recognizes the fact that even in a small "Jeep-size" four-wheel drive vehicle, there is somewhere around forty feet of fabric top that has to be snapped, tucked or otherwise detachably connected to the body, the true magnitude of the problem can be appreciated. As a matter of fact, the mounting of soft tops on these vehicles became so troublesome to one manufacturer that they refused to do it at the factory and required their dealers to install the tops at the point of delivery.

Returning once again to FIG. 1, contrast the above with the manner in which the improved tongue-and-groove connection of the present invention works. As before, the fabric is stretched, but only so far as to permit the leading edge 50 of the tongue 12 to slide over the edge of flange 20 and begin to enter the mouth of groove 22 as shown in phantom lines. Once in place occupying the phantom-line position, the user can effectively release his or her "pull" upon the fabric so long as a hold is maintained on the trailing edge 52 of the tongue-forming element such that it can be pushed toward the tongue-retaining element 14 and rotated into groove 22 therein. Actually, the edge of flange 20 defines a fulcrum around which the tongue is "levered" into place. Most importantly, this can be done incrementally in the sense that once a small section occupies the phantom-line position of FIG. 1, it can be placed in the groove without having the whole section stretched and ready to enter same all primarily due to the fact that the tongue does not have to be turned under or twisted in any way. As each segment in turn is pulled taut, stretched and turned into the groove before being released, it will become apparent that this simple operation can be handled by one person quickly and efficiently. As a matter of fact, savings in time of installation alone over the prior art method of FIG. 2 amounting to 25% and more have been observed.

If fastening the cover to the frame in accordance with the prior art method of FIG. 2 weren't bad enough, unfastening it is even worse in that there is nothing available outside the groove to get ahold of for the purpose of restretching the fabric and pulling the tongue free. By way of contrast, in the method of FIG. 1, it becomes a simple matter to grab ahold of the projecting portion 30P of the tongue and pull upon it to simultaneously stretch the fabric and free the tongue. There is also less wear and tear upon the fabric since it is not bent around the edge of the flange 20 as in the prior art method nor is it in contact with the inside of the groove.

From an operational standpoint, the prior art connections like that shown in FIG. 2 have proven to be most unsatisfactory in that the pull upon the fabric panel 34 acts to twist the tongue-forming element 12PA out of the groove as it tends to unfold. So serious was this problem that convertible tops were found to come loose during high winds and sometimes even at high highway speeds. Conversely, the forces acting upon the tongue-forming means 12 in the improved connection forming the subject matter hereof are such that the forces acting thereon are primarily directed parallel to the tongue and in a direction to seat it more firmly into the bottom of the groove due to the stretch in the fabric. While admittedly, there are some torsional forces acting upon the tongue that would rotate it out of the groove, they are minimal, especially if the line of connection (36) of the fabric panel with the tongue lies closely adjacent the free edge of flange 20 such that the lever arm defined by the latter and the stitching is kept quite short. Returning to the thickness of the tongue, it is for this reason that it should be thick enough to effectively resist bending along a longitudinal line under the normal pull exerted thereon by the stretched fabric because, if it were too thin and flexible, it would merely fold over flange 20. Even so, it should not be so thick as to effectively prevent bending along a transverse line since this is necessary to bend it around corners like in FIG. 3 and especially to feed it incrementally a section at a time into the grooved element.

Accordingly, while at first glance there appear to be strong analogies between the prior art system and that of the instant improvement, as a matter of fact they are quite different and the latter constitutes a considerable advance over the former, so much so that the earlier system has been largely abandoned.

What is claimed is:

1. In a fastener for detachably connecting a stretchable fabric cover to a rigid frame and which includes a groove-forming means attachable to the rigid frame and which has a first leg attached to the rigid frame and a second leg spaced from the first leg and attached thereto by a web to define a groove with a bottom and an entryway, the second leg having a front edge, the groove in said groove-forming means having a depth as measured between the front edge and the web considerably greater than its width as measured between the first and second legs opening in the direction which the fabric is stretched the improvement in combination therewith comprising: a tongue-forming means comprising an elongate strap sized for edgewise insertion into the groove of said groove-forming means, said strap having a thickness adapted to effectively resist bending along a line extending in the direction of the length thereof, and said strap being of width substantially greater than the depth of said groove to define an insertable portion having a free edge, a trailing edge, and a projecting portion adjacent to said trailing edge, said projecting portion projecting beyond the entryway into the groove when the free edge of the insertable portion is seated in the bottom thereof; and fabric-attaching means attaching the fabric cover to the strap, said attaching means being positioned at a location between said strap trailing and free edges, the fabric cover being folded around said trailing edge and attached to said strap by said attaching means so that the fabric cover forms two portions which are in face-to-face relation to one another with said projecting portion therebetween along an area extending lengthwise of the projecting portion trailing edge, said attaching means being located outside the entryway into the groove when said strap is positioned in the groove with said strap free edge abutting the web, said strap projecting portion defining a handhold for stretching the fabric cover to where the free edge of the strap insertable portion is in position for release into the entryway into the groove whereby stretching of the fabric cover and insertion of said strap into the groove are facilitated.

2. The two-part fastener as set forth in claim 1 in which: the strap is bendable along a line extending substantially transversely thereof.

3. The two-part fastener as set forth in claim 1 in which: the strap is twistable along a line extending in the direction of the length thereof.

4. The two-part fastener as set forth in claim 1 in which: the width and depth of the groove are sized in relation to the width and thickness of the projecting portion of the strap such as to maintain the latter in substantially parallel relation to the streched panel fastened thereto.

5. The two-part fastener as set forth in claim 1 in which: the means attaching the panel to the projecting portion of the strap comprises stitching.

6. The fastener defined in claim 1 wherein the improvement further comprises a lever means of the type having a fulcrum located adjacent to one end thereof and one of the forces acting thereon acts adjacent to the other end thereof with a second force acting against said lever means at a location between said fulcrum and said other end, said fulcrum including said second leg front edge, said fabric attaching means attaching the fabric cover to said strap at a location which is spaced apart from said fulcrum and which is located between said fulcrum and said strap trailing edge.

7. In a fastener of the type having a groove-forming element attached to a rigid frame with the groove-forming element including a first leg attached to the rigid frame, a second leg spaced from the first leg and connected thereto by a web to form a groove and having a front edge thereon, for detachably connecting a stretchable fabric cover to the rigid frame, the improvement in combination therewith comprising:

a tongue means adapted to fit into the groove and having an elongate strap which includes a free edge and a trailing edge and that is sized between said free and trailing edges to locate said trailing edge outside of the groove when said free edge abuts the web of the groove-forming element;

fabric-attaching means attaching the fabric cover to said strap, said attaching means being positioned at a location between said stap trailing and free edges, the fabric cover being folded around said trailing edge and attached to said strap by said attaching means so that the fabric cover forms two portions which are in face-to-face relation to one another with said strap trailing edge therebetween along an area extending lengthwise of said strap trailing edge, said attaching means being located outside the groove when said strap is positioned in said groove with said strap free edge abutting said web; and a lever means for stretching the fabric while said tongue means strap is being inserted into the groove of the groove-forming element.

* * * * *

REEXAMINATION CERTIFICATE (3552nd)

United States Patent [19]

Rippberger

[11] B1 4,757,854
[45] Certificate Issued  Jun. 23, 1998

[54] APPARATUS FOR DETACHABLY FASTENING A STRETCHABLE FABRIC PANEL TO A RIGID FRAME

[75] Inventor: Gary R. Rippberger, Boulder, Colo.

[73] Assignee: Bestop, Inc., Longmont, Colo.

Reexamination Request:
No. 90/004,871, Dec. 15, 1997

Reexamination Certificate for:
Patent No.: 4,757,854
Issued: Jul. 19, 1988
Appl. No.: 19,438
Filed: Feb. 26, 1987

[51] Int. Cl.⁶ .................................................. A47H 13/00
[52] U.S. Cl. ........................... 160/391; 160/378; 160/395
[58] Field of Search ........................... 160/391, 378, 160/395, 387; 38/102.1, 102.91; 296/121, 120 A

[56] References Cited

U.S. PATENT DOCUMENTS

| | | |
|---|---|---|
| 654,993 | 7/1900 | Martin . |
| 1,294,879 | 2/1919 | Davis . |
| 1,367,928 | 2/1921 | Stolp . |
| 1,538,759 | 5/1925 | Thomas . |
| 1,601,443 | 9/1926 | Haver . |
| 1,894,527 | 1/1933 | Yengst . |
| 2,020,451 | 11/1935 | Atwell ........................... 296/51 |
| 2,325,500 | 7/1943 | Fosberg ........................ 160/383 |
| 2,352,609 | 7/1944 | Bates ............................ 160/267 |
| 2,460,399 | 2/1949 | Schassberger ............... 296/44 |
| 2,463,646 | 3/1949 | Schassberger ............. 296/104 |
| 2,537,611 | 1/1951 | Walton ......................... 160/268 |
| 2,610,086 | 9/1952 | Shield ........................... 296/105 |
| 2,711,342 | 6/1955 | Selzer ........................... 296/32 |
| 2,936,195 | 5/1960 | Schutte ......................... 296/106 |
| 3,053,566 | 9/1962 | Allen ............................ 296/106 |
| 3,160,436 | 12/1964 | Duddleston ................. 296/105 |
| 3,167,349 | 1/1965 | Young et al. ................ 296/137 |
| 3,177,501 | 4/1965 | Kwake .......................... 4/172 |
| 3,186,712 | 6/1965 | Kessler ......................... 273/51 |
| 3,201,171 | 8/1965 | Wickard ...................... 296/100 |
| 3,211,492 | 10/1965 | Wozena et al. .............. 296/44 |
| 3,354,473 | 11/1967 | Schwarz et al. ............. 4/172 |
| 3,373,464 | 3/1968 | Ausnit .......................... 24/201 |
| 3,391,724 | 7/1968 | Charlesworth .............. 160/368 |
| 3,404,914 | 10/1968 | Stengel ......................... 296/120 |
| 3,405,489 | 10/1968 | Frisk ............................. 52/222 |
| 3,406,483 | 10/1968 | Mitchell ....................... 49/192 |
| 3,606,448 | 9/1971 | Walker ......................... 296/105 |
| 3,719,013 | 3/1973 | Blick ............................. 52/222 |
| 3,765,717 | 10/1973 | Garvert ........................ 296/137 B |
| 3,768,540 | 10/1973 | McSwain ..................... 160/23 R |

(List continued on next page.)

FOREIGN PATENT DOCUMENTS

| | | |
|---|---|---|
| 1132168 | 9/1982 | Canada . |
| 0043466 | 2/1982 | European Pat. Off. . |
| 28378 | 9/1959 | Germany . |
| 2306749 | 8/1973 | Germany . |
| 2264596 | 7/1974 | Germany . |
| 3136897 | 3/1983 | Germany . |
| 3200083 | 7/1983 | Germany . |
| 464490 | 12/1968 | Switzerland . |
| 884624 | 11/1981 | U.S.S.R. . |
| 992249 | 2/1983 | U.S.S.R. . |
| 1214421 | 12/1970 | United Kingdom . |

*Primary Examiner*—Blair M. Johnson

[57]  ABSTRACT

This invention relates to an improved tongue and groove connector for detachably fastening a stretchable fabric panel to a rigid frame which is characterized by a tongue-forming element attached along a line intermediate the side edges thereof to the panel in face-to-face relation to the latter, the tongue being of a width substantially greater than the groove is deep so as to define an insertable portion to be seated in the groove and a projecting portion extending therebeyond which defines a handhold. The invention also encompasses the novel method of making the aforesaid connection which comprises grasping the handhold to stretch the fabric to a point where the leading edge of the insertable portion lies adjacent the entryway into the groove and thereafter releasing the hold upon the projecting portion of the strap thereby permitting the stretched fabric to pull the insertable portion into seated relation in the bottom of the groove.

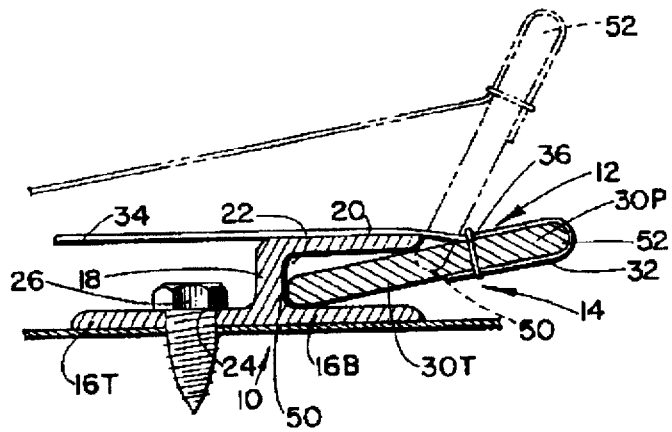

U.S. PATENT DOCUMENTS

| | | | |
|---|---|---|---|
| 3,774,959 | 11/1973 | Brudy | 296/121 |
| 3,958,826 | 5/1976 | Upton | 296/78 R |
| 4,036,521 | 7/1977 | Clenet | 296/100 |
| 4,061,394 | 12/1977 | Vodin | 296/100 |
| 4,093,302 | 6/1978 | Adams | 296/23 R |
| 4,179,152 | 12/1979 | Kent, Jr. | 296/196 |
| 4,188,764 | 2/1980 | Gode | 52/582 |
| 4,233,765 | 11/1980 | O'Mullan et al. | 40/156 |
| 4,272,119 | 6/1981 | Adams | 296/100 |
| 4,285,539 | 8/1981 | Cole | 296/105 |
| 4,289,346 | 9/1981 | Bourgeois | 296/105 |
| 4,505,512 | 3/1985 | Schmeichel et al. | 296/98 |
| 4,600,235 | 7/1986 | Frederick et al. | 296/106 |
| 4,639,033 | 1/1987 | Wheatley et al. | 296/100 |
| 4,647,103 | 3/1987 | Walblay | 296/100 |
| 4,792,179 | 12/1988 | Stevens | 296/100 |
| 5,058,652 | 10/1991 | Wheatley et al. | 160/327 |

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–7 is confirmed.

* * * * *